US012685962B2

(12) United States Patent (10) Patent No.: US 12,685,962 B2
Sams et al. (45) Date of Patent: Jul. 21, 2026

(54) GAS DEHYDRATOR AND METHOD OF USING SAME

(71) Applicant: CAMERON INTERNATIONAL CORPORATION, Houston, TX (US)

(72) Inventors: Gary W. Sams, Houston, TX (US); Luis Eduardo Caires-Fernandez, Houston, TX (US); Glen Andrew Hay, Calgary (CA); Meng Shi, Houston, TX (US); Robert Douglass, Houston, TX (US)

(73) Assignee: Cameron International Corporation, Houston, TX (US)

(*) Notice: Subject to any disclaimer, the term of this patent is extended or adjusted under 35 U.S.C. 154(b) by 0 days.

(21) Appl. No.: 19/113,923

(22) PCT Filed: Sep. 21, 2023

(86) PCT No.: PCT/US2023/074786
§ 371 (c)(1),
(2) Date: Mar. 21, 2025

(87) PCT Pub. No.: WO2024/064822
PCT Pub. Date: Mar. 28, 2024

(65) Prior Publication Data
US 2026/0097355 A1 Apr. 9, 2026

Related U.S. Application Data

(60) Provisional application No. 63/518,681, filed on Aug. 10, 2023, provisional application No. 63/489,340, (Continued)

(51) Int. Cl.
*B01D 53/14* (2006.01)
*B01D 53/18* (2006.01)
(Continued)

(52) U.S. Cl.
CPC ..... *B01D 53/1425* (2013.01); *B01D 53/1493* (2013.01); *B01D 53/18* (2013.01); (Continued)

(58) Field of Classification Search
CPC ........... B01D 53/1425; B01D 53/1493; B01D 53/18; B01D 53/263; B01D 2252/2026; (Continued)

(56) References Cited

U.S. PATENT DOCUMENTS

| | | | | |
|---|---|---|---|---|
| 3,648,434 A | * | 3/1972 | Gravis, III | ............... B01D 1/00 95/231 |
| 5,209,762 A | | 5/1993 | Lowell | |

(Continued)

FOREIGN PATENT DOCUMENTS

| | | |
|---|---|---|
| JP | 2013124256 A | 6/2013 |
| WO | 0002642 A1 | 1/2000 |
| WO | 2009109052 A1 | 9/2009 |

OTHER PUBLICATIONS

International Search Report and Written Opinion of International Patent Application No. PCT/US2023/074786 dated on Jan. 22, 2024, 09 pages.

*Primary Examiner* — Dung H Bui
(74) *Attorney, Agent, or Firm* — Kyle R. Miiller

(57) ABSTRACT

Systems and methods presented herein generally relate to recycling, or reducing flaring or venting, of vent gases from glycol based dehydration of natural gas. Some systems and methods use high pressure gas, high pressure glycol, or pump-assisted high pressure glycol to provide motive energy to draw reflux gas and/or skimmer gas through one or more venturis and back to the contact tower of the dehydration system. Some systems and methods provide for harvesting energy from the dehydration process.

17 Claims, 16 Drawing Sheets

Related U.S. Application Data filed on Mar. 9, 2023, provisional application No. 63/489,336, filed on Mar. 9, 2023, provisional application No. 63/489,339, filed on Mar. 9, 2023, provisional application No. 63/376,461, filed on Sep. 21, 2022.

(51) Int. Cl.
   *B01D 53/26* (2006.01)
   *C10L 3/10* (2006.01)

(52) U.S. Cl.
   CPC ............ *B01D 53/263* (2013.01); *C10L 3/106* (2013.01); *B01D 2252/2026* (2013.01); *B01D 2256/245* (2013.01); *B01D 2257/80* (2013.01); *C10L 2290/12* (2013.01); *C10L 2290/48* (2013.01); *C10L 2290/541* (2013.01)

(58) Field of Classification Search
   CPC .......... B01D 2256/245; B01D 2257/80; C10L 3/106; C10L 2290/12; C10L 2290/48; C10L 2290/541
   See application file for complete search history.

(56) References Cited

U.S. PATENT DOCUMENTS

| | | | | | |
|---|---|---|---|---|---|
| 5,346,537 | A * | 9/1994 | Lowell | ................. | B01D 53/263 |
| | | | | | 96/201 |
| 5,575,894 | A * | 11/1996 | Foral | .................. | B01D 53/1425 |
| | | | | | 202/160 |
| 5,665,144 | A * | 9/1997 | Hill | ......................... | B01D 3/322 |
| | | | | | 95/193 |
| 6,149,876 | A * | 11/2000 | Galloway | ............... | F23G 7/065 |
| | | | | | 422/198 |
| 6,375,806 | B1 * | 4/2002 | Hicks | ....................... | B01D 3/42 |
| | | | | | 203/18 |
| 6,964,729 | B1 * | 11/2005 | Khosrowyar | .......... | B01D 3/143 |
| | | | | | 95/239 |
| 6,984,257 | B2 * | 1/2006 | Heath | .................. | B01D 53/263 |
| | | | | | 96/201 |
| 10,252,182 | B2 * | 4/2019 | Lee | .......................... | C07C 29/80 |
| 2011/0126707 | A1 * | 6/2011 | Noel | ......................... | C10L 3/10 |
| | | | | | 95/117 |
| 2012/0238793 | A1 * | 9/2012 | Cullinane | .............. | B01D 53/18 |
| | | | | | 585/833 |
| 2013/0202497 | A1 * | 8/2013 | Tirtowidjojo | ............ | B01D 3/38 |
| | | | | | 422/187 |
| 2015/0128802 | A1 * | 5/2015 | Moneyhun | ......... | B01D 53/1425 |
| | | | | | 96/242 |
| 2016/0348018 | A1 | 12/2016 | Nichols et al. | | |
| 2017/0145803 | A1 * | 5/2017 | Yeh | .................... | B01D 53/1425 |
| 2020/0164306 | A1 * | 5/2020 | Laroche | ................. | B01D 53/28 |
| 2021/0001268 | A1 * | 1/2021 | Al-Enazi | ........... | B01D 53/1493 |
| 2021/0069634 | A1 * | 3/2021 | Cullinane | ......... | B01D 53/1425 |

* cited by examiner

| Case # | Technology | Process Description | Recovery |
|---|---|---|---|
| 1 | Ejector | Flash gas to Sales gas | Re-compression |
| 2 | Ejector | Flash gas + Reflux Non-condensables to Feed gas | Re-compression |
| 3 | Ejector | Flash gas to glycol feed to contactor | Incremental Pump |
| 4 | PCV | Flash gas to Fuel (not viable with electric reboiler) | NA |
| 5 | Compressor | Flash gas to Feed gas | NA |
| 6 | Drizo | Reflux condensables recycle as Stripping gas | Pump/Heat |
| 7A | Strip Gas | Sales gas to Strip (computed for reference only) | NA |
| 7B | Vacuum | Reflux vacuum in lieu of stripping gas or Drizo | Compressor/Ejector |
| 8a-d | Ejectors | Non-Condensables to glycol discharge and flash gas to feed gas | Re-compression |

FIG. 1B

GAS DEHYDRATOR AND METHOD OF USING SAME

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a National Stage Entry of International Application No. PCT/US2023/074786, filed Sep. 21, 2023, which claims priority benefit of U.S. Provisional Application No. 63/376,461, filed Sep. 21, 2022, U.S. Provisional Application No. 63/489,339, filed Mar. 9, 2023, U.S. Provisional Application No. 63/489, 340, filed Mar. 9, 2023, U.S. Provisional Application No. 63/489,339, filed Mar. 9, 2023, and U.S. Provisional Application No. 63/518,681, filed Aug. 10, 2023, the entirety of each of which is incorporated by reference herein and should be considered part of this specification.

BACKGROUND

Field

The present disclosure relates generally to processes and systems associated with oil and gas extraction, and more specifically, to triethylene glycol (TEG)-based dehydration systems and processes.

Description of the Related Art

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

The process of extracting and processing natural gas inevitably results in some greenhouse gas emissions, and those emissions lead to global warming, contributing significantly to climate change. As such, operators in upstream and midstream oil and gas are interested in reducing greenhouse gas emissions from their facilities. Such emissions arise from a range of facilities (e.g., single wells to gas plant), sources (e.g., intentional vents to unintentional fugitive leaks), and equipment (e.g., tanks, compressors, separators, pneumatic controllers, and so forth).

In natural gas systems, removing water vapor reduces pipeline corrosion and eliminates or reduces line blockage caused by hydrate formation. The water dewpoint must be below the lowest pipeline temperature to prevent free-water formation. Triethylene glycol dehydration systems are among the most widely used in the oil and gas industry due to low operating costs and relatively low capex. As benzene, toluene, ethylbenzene, and xylene (BTEX) are soluble in glycol, glycol dehydration systems can also remove BTEX, as well as other volatile organic compounds (VOCs).

Two potentially large sources of emissions from most TEG-based dehydrators include the flash separator and the reflux column. The gas from the flash separator is routinely used as fuel for the reboiler. However, as the O&G industry increases use of electrical energy, the use of natural gas for heating will decline. This flash gas can either be vented, flared, or recycled. Recycling, when done correctly, significantly reduces the GHG emissions from the flash gas compared to venting or flaring. Gas from the reflux column contains all of the water extracted by the gas dehydrator plus other hydrocarbon gases including BTEX that are soluble in the glycol. If BTEX is not present, the reflux gas can be vented. When BTEX is present, the reflux gas is usually flared or otherwise combusted.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method for dehydrating natural gas wherein vented gases from the dehydration process are routed back to the inlet of a contact tower absorber. The vented gases may be reflux gases and/or flash gases.

Certain embodiments of the present disclosure include a system for dehydrating natural gas comprising a contact tower absorber and means to reroute vented gas from the system back to the inlet of the contact tower absorber. The vented gases may be reflux gases and/or flash gases.

In some configurations, a glycol based dehydration system includes a contact tower, a glycol reconcentration system, and one or more venturis. In use, wet gas enters the contact tower and is dehydrated by glycol flowing through the contact tower, and water-rich glycol exits the contact tower. The glycol reconcentration system is configured to filter and heat the water-rich glycol to produce purified glycol. The glycol reconcentration system includes a glycol recirculation pump. In use, reflux vent and/or skimmer gases are drawn through the one or more venturis to the contact tower.

The one or more venturis can include cascaded venturis. In use, process bleed gas can be routed to the one or more venturis as a means of pressure control to avoid excessively low pressure on the reflux column. The system can further include system controls configured to improve gas recovery, achieve steady state operation, and/or avoid undesirable operating modes. The system controls can include a processor.

In some configurations, a glycol based dehydration system includes a contact tower, a glycol reconcentration system, and an energy exchange pump. In use, wet gas enters the contact tower and is dehydrated by glycol flowing through the contact tower, and water-rich glycol exits the contact tower. The glycol reconcentration system is configured to filter and heat the water-rich glycol to produce purified glycol.

Various refinements of the features noted above may be undertaken in relation to various aspects of the present disclosure. Further features may also be incorporated into these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which:

FIG. 1B illustrates a table summarizing various configurations of systems and processes for reducing or avoiding venting of reflux and/or flash gases from the system and process of FIG. 1A.

DETAILED DESCRIPTION

Figure 1A:
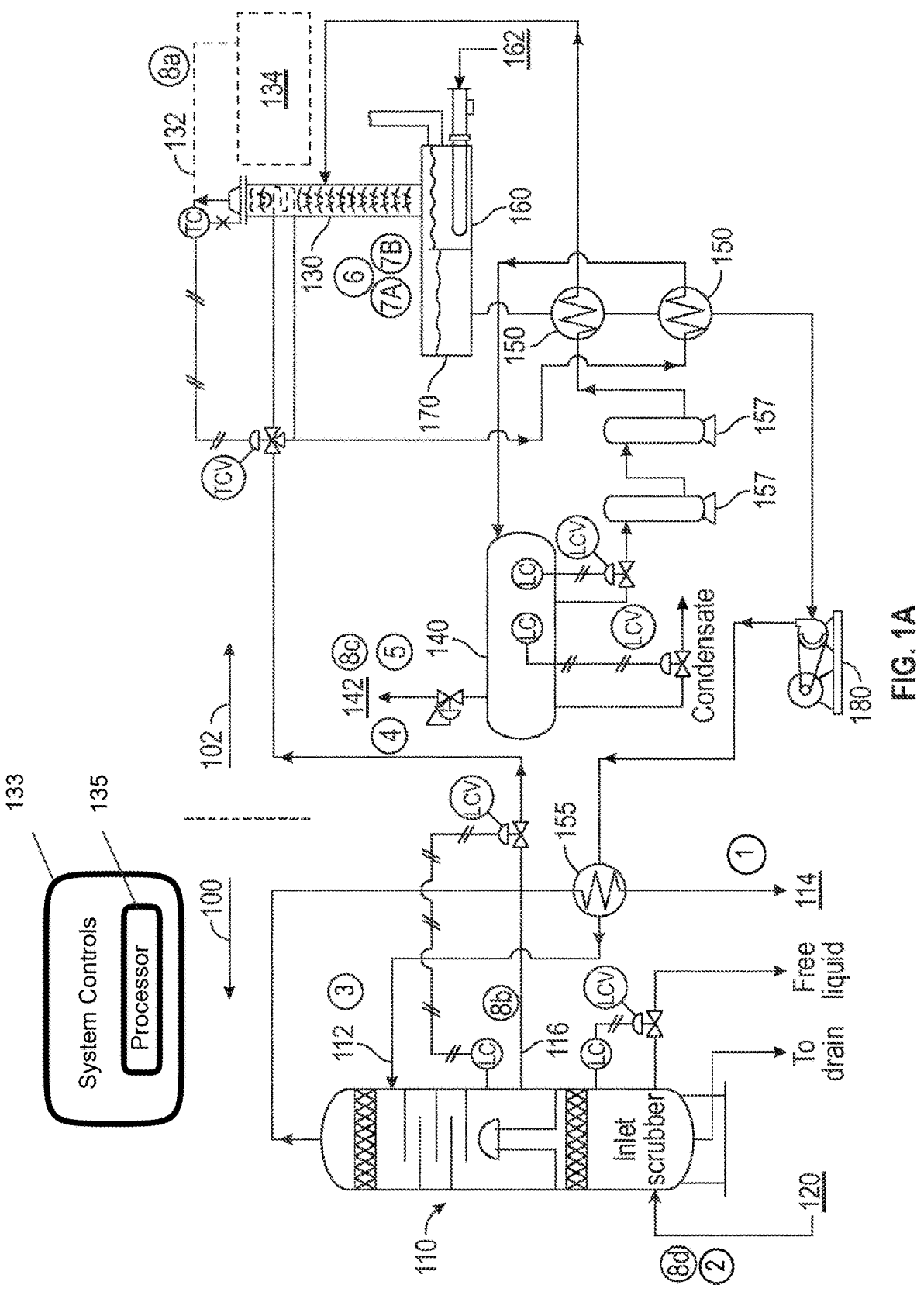
FIG. 1A schematically illustrates an example glycol dehydrator system and process.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "automatic" and "automated" are intended to describe operations that are performed or are caused to be performed, for example, by a greenhouse gas emission analysis system (i.e., solely by the greenhouse gas emission analysis system, without human intervention).

To meet pipeline specifications, operators are often required to dehydrate their produced natural gas that is saturated with water vapor. Water vapor in natural gas pipelines can result in the formation of hydrates that can obstruct or plug the pipe. Water vapor in a pipeline can also cause corrosion due to the presence of carbon dioxide ($CO_2$) or hydrogen sulfide ($H_2S$) in the natural gas. Most natural gas producers use triethylene glycol (TEG) dehydrators to remove water from natural gas to meet pipeline water content requirements. However, other glycol-based solvents such as monoethylene glycol (MEG) and diethylene glycol (DEG) may also be used.

An example dehydration system and process includes a high pressure contacting system and/or process 100 and a low pressure glycol regeneration system and/or process 102, as shown in FIG. 1A. In the contacting system and/or process, wet gas 120 enters a contact tower, absorber, or glycol contactor 110 at or near the bottom of the tower 110 and flows upward. Dry or lean (water poor) glycol 112 flows downward through the tower 110 from at or near the top of the tower 110. In some configurations, the dry glycol flows from tray to tray or through packing material. The operating pressure of the contact tower 110 is close to pipeline pressure conditions. The wet gas 120 contacts the dry glycol 112 as the wet gas 120 and dry glycol 112 flow through the tower 110. Water in the natural gas is absorbed by circulating glycol, and the natural gas is dehydrated and the gas dew point is reduced. A unique bubble cap configuration can maximize gas-glycol contact, for example, removing water to levels below 5 lbm/MMcf. Advanced systems can be designed to achieve levels less than 1 lbm/MMcf.

The dehydrated gas is referred to as dry gas 114 and exits through the top of the glycol contactor 110. The dry gas 114 may be routed through a gas/glycol heat exchanger 155. The dry gas can return to the pipeline or be routed to other processing units. The glycol that absorbed the water is called rich glycol 116 (water laden). The rich glycol 116 exits the glycol contactor 110, for example from at or near the bottom of the glycol contactor 110.

The rich glycol 116 flows through the glycol regeneration system and process 102. From the contactor 110 exit, the rich glycol 116 can flow through a reflux or heat exchange coil in a reflux column or still 130. The rich glycol 116 is routed, in some configurations through a glycol/glycol heat exchanger 150, to a flash separator or skimmer 140, which separates gas and entrained hydrocarbons from the glycol. In some configurations, the separated gas (flash gas 142) flows to a fuel gas scrubber and can be used as fuel gas 162 (e.g., for a reboiler 160). The flash gas 142 can be discharged at pressures ranging from 50 to 200 psig. The rich glycol can flow through one or more filters 157, a glycol/glycol heat exchanger 150, and/or the still 130 to reach a reboiler 160. The reboiler 160 drives off water vapor through the still 130. The water vapor exits the still 130 as part of the reflux gas 132. Hot, reconcentrated glycol may flow from the reboiler to a sparger box (Surge tank) to remove additional water vapor. Lean glycol flows to a storage compartment 170 (Surge tank) and then to the glycol/glycol heat exchanger 150 for cooling. The cooled lean glycol 112 then flows to a glycol pump 180. Lean glycol and gas from the absorber 110 together may power the glycol pump 180. Alternatively, the glycol pump 180 may be powered electrically. The glycol pump 180 pumps the glycol 112 through the glycol/gas heat exchanger 155 to minimize glycol loss and then to the absorber tower 110 to continue the dehydration process cycle.

The reflux gas 132 from the reflux column 130 contains the water removed by the contactor column 110, some soluble natural gas, and may contain benzene, toluene, ethylbenzene, and/or xylene (BTEX). If BTEX is present in high concentrations, it is common to flare the reflux gas 132 to eliminate the carcinogenic BTEX from the surrounding environment (BTEX control 134). If BTEX is not present, the reflux gas 132 may be vented or flared. The reflux vent is at atmospheric pressure.

The present disclosure provides methods and apparatus to reduce greenhouse gas emissions from oil and gas processing plants. The proposed methods and systems aim to reduce or eliminate the venting or flaring of intentional gases typically discharged from a glycol-based gas dehydrator system. To reduce the environmental impact of the flash gas 142 and/or reflux gas 132, the present disclosure provides several techniques to recycle these gases 132, 142, for example, back to the contact tower 110, to reduce or avoid venting or flaring altogether. In some configurations, vented gas from one or both vents 132, 142 are collected and routed back to the inlet(s) of the contact tower 110. To enhance the recycling, the volume of water contained in the recycled gases can be minimized. The flash gas 142 and reflux gas 132 can be handled independently for recycling or combined before recycling.

Because the reflux gas 132 contains nearly 100% of the water removed from the process, it can't be recycled or injected without first removing the water and condensable gases by lowering the reflux gas temperature. The liquids that form from the cooling include both condensed water and hydrocarbons. These liquids can be separated, creating two streams, namely the condensable and non-condensable. The non-condensable gas can be recycled to the contact tower 110 by one or more systems and/or methods according to the present disclosure.

FIGS. 1A and 1B illustrate various example configurations of systems and processes for avoiding or reducing discharge of flash gas 142 and/or non-condensable reflux gas 132 into the atmosphere, with circled numbers in FIG. 1A corresponding to case numbers of the table of FIG. 1B. The system can further include system controls 133 configured to improve gas recovery, achieve steady state operation, and/or avoid undesirable operating modes. The system controls can include a processor 135.

In case 1, an ejector or jet pump is used to route or add the flash gas 142 to sales gas (dry gas 114) via re-compression. In case 2, an ejector or jet pump is used to route or add the flash gas 142 and non-condensable reflux gas 132 to the feed gas (wet gas 120) via re-compression. In case 3, an ejector or jet pump is used to route or add the flash gas 142 to the dry glycol feed 112 entering the contactor 110 via an incremental pump. In case 4, the flash gas 142 is used as fuel 162 (for a gas-powered reboiler 160) via a PCV. In case 5, a compressor is used to route or add the flash gas 142 to feed gas 120. In case 6, Drizo technology is used to recycle condensable reflux gas 132 for use as stripping gas. Stripping gas can be added to the hot glycol in the reboiler 160 to enhance purity of the lean glycol. In case 7A, sales gas is used as strip gas. In case 7B, a vacuum, for example via a compressor or ejector, is used to capture reflux gas 132. In case 8, one or more ejectors or jet pumps are used to route or add the non-condensable reflux gas 132 (at 8a) to the rich glycol discharge 116 of the contactor 110 (at 8b) and the flash gas 142 (at 8c) to the feed gas 120 (at 8d).

Figure 2:
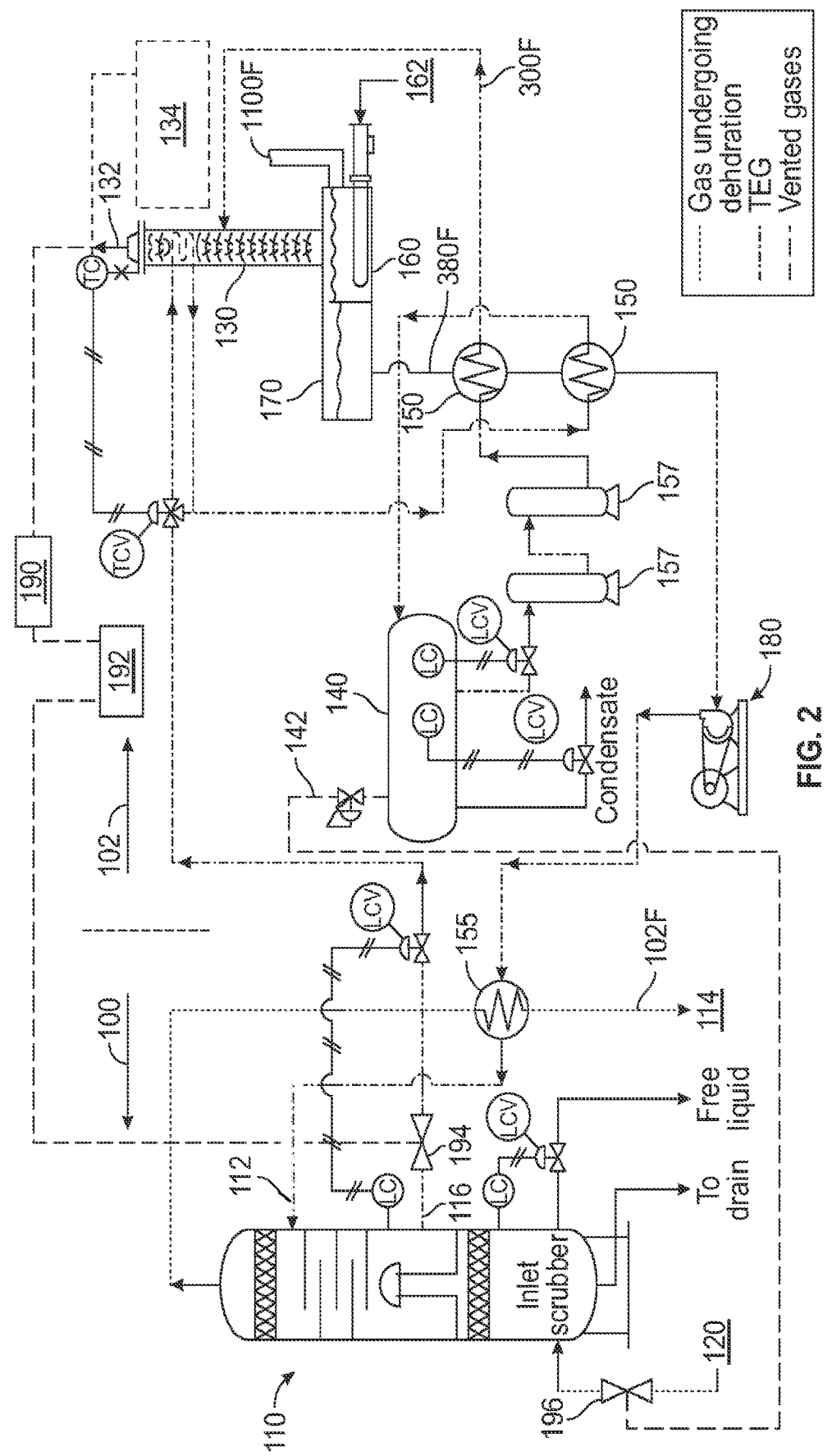
FIG. 2 schematically illustrates an example glycol dehydrator system and process for reducing or avoiding venting of reflux and/or flash gases.

FIG. 2 further illustrates case 8 of FIGS. 1A-1B, which provides enhanced opportunity to avoid venting. In the system and method of FIG. 2, a glycol circulation jet pump elevates the reflux gas 132 to the pressure of the flash separator 140. The flash separator 140 can be operated at a sufficient pressure for the gas-gas ejector at the contact tower 110 inlet (at 8d). In the example provided in FIG. 2, dotted lines represent the gas requiring dehydration. Dash dot lines represent the TEG being routed through the various exchangers, pump, separator, reboiler, reflux column and contact tower. Dashed lines are the vented gases from the skimmer (or flash separator) and reflux column which contain the greenhouse gases to be routed to the contactor tower.

A system according to case 8 can include a heat exchanger (HEX) 190 (for example, a condensing cooler) and a separator 192 (e.g., a gas/liquid separator that separates condensed water from non-condensable gases). The off-gases 132 from the reflux column 130 (at 8a) are routed to the heat exchanger 190 and the separator 192. The system also includes a L/G (liquid/gas) eductor 194 at 8b. The L/G eductor 194 collects the non-condensable reflux gas 132 and delivers it to the skimmer 140 for separation (at step 8c). The gases from the skimmer 140 are routed to a G/G (gas/gas) ejector 196 where they are collected and delivered to the bottom of the contact tower 110.

Further details regarding the process steps of case 8 to collect the vent gases 132 from the reflux column 130 and the vent gases 142 from the flash separator 140 are provided below:

a. As reflux gases 132 contain the water removed by the contact tower 110, the water must be removed from the reflux gases 132 before recycling. Cooling can be accomplished by any number of heat exchangers, for example, air exchange, water exchange, heat pump, etc. The exchanger(s) 190 reduce a high percentage of the water vapor into liquid water for removal by the separator 192. Depending on the reflux vent 132 composition, the separator 192 may also produce a condensate stream in addition to the liquid water. In some configurations, Drizo technology can use this condensate as a recycle stream instead of stripping gas and/or be implemented with the vapor recovery stream.

b. The non-condensable gases from the separator 192 are routed to the liquid-gas eductor (i.e. jet pump) 194. The high-pressure glycol 116 from the contact tower 110 can be used as the motive fluid to draw the non-condensable gases into a venturi. The pressure of the HP wet glycol 116 is typically decreased across a level control valve and delivered to the flash separator 140.

In some configurations, the eductor 194 reduces the reflux column pressure (lowering the vapor pressure) and the glycol quality (dryness) improves, possibly reducing the need for stripping gas to produce the high-quality glycol needed to achieve low dewpoint gas. If the glycol 116 flow and pressure are insufficient to draw the reflux gas 132, a recycle pump can be used to draw from the bottom of the flash separator 140 to increase the motive glycol to the jet pump 194.

c. The gases that are soluble in the glycol 116 and the combined non-condensable gas 132 can be separated in the flash separator 140. The pressure of the flash separator 140 can be adjusted using a back-pressure regulator to optimize the recovery. Higher separator pressure reduces the flash gas 142 volume and increases the non-condensable/condensate volume in the reflux column.

d. The flash separator gas 142 can be routed to the gas-gas ejector 196 located in the feedline to the dehydrator column 110. If the wellhead pressure is higher than the sales line pressure, the majority of this differential might be available to collect the flash gas 142. Due to the limited compressibility of a gas-gas ejector (8:1), the flash gas 142 pressure may need to be increased to achieve the required performance. For example, assume the wellhead pressure is 1500 psig and the sales line is 1000 psig. Assume the ejector 196 needs a pressure drop of 250 psig to draft the flash gases 142. Therefore, the discharge pressure from the eductor 196 will be 1250 psig, and the flash separator 140 must be operated at no less than 156 psig (1250/156=8). In some cases, the gas-gas ejector 196 develops a low temperature at the venturi throat, which can create ice crystals or methane hydrates. The formation of ice/hydrates is typically avoided, but, in this case, may be beneficial to the overall process. Assume the inlet water load is 100 lb/MMscf and the target is 4 lb/scf. The glycol circulation rate is determined to absorb 96 lb/MMscf. Assuming that 50% of the incoming water is converted to ice/hydrates and separates in the contact tower, the water load is reduced to 50 lb/MMscf. The glycol circulation rate remains constant but the L/G equilibrium in the contactor has been shifted resulting in a lower water load in the dry gas.

The system and method of case 8 described herein advantageously uses energy otherwise wasted when reducing the pressure of the absorber 110 bottom liquids to the lower flash tank 140 pressure. If this energy isn't used to recover vent gases, other techniques might be used to collect this energy to reduce GHG emission. For example, in some configurations, the hydraulic system might recover the pressure energy through a liquid-liquid turbocharger. This unit could recover the high-pressure contactor bottom fluid and transfer it to either the circulated lean TEG or other liquids that could be used in a vapor-liquid jet pump application as described herein. In both these situations, the recovered pressure energy can replace an otherwise electric system with any associated GHG emissions. As another example, in some configurations, a turbo-generator system might recover the pressure energy with an electric generator. In this embodiment, the direct electric generation might subsidize some power requirements required for the facility and therefore reduced related GHG emissions.

In some systems and methods according to the present disclosure, the glycol circulation pump 180 is replaced with a single or multiple stage recycling venturi (also referred to as a jet pump or eductor) permitting the skimmer or flash vent 142 and the reflux vent 132 to be collected and routed back to the contact tower 110. The skimmer vent 142 can be discharged at pressures ranging from 50 to 200 psig. The reflux vent 132 is at atmospheric pressure.

In some systems and methods according to the present disclosure, high pressure gas, high pressure glycol, and/or pump-assisted high pressure glycol provides the motive energy to draw low pressure gases from the reflux vent 132 and flash separator/skimmer vent 142 via a venturi (e.g., a jet pump or ejector) 195 arrangement and route the vapors back to the contact tower 110. The skimmer vent 142 can be discharged at pressure ranging from 50 to 250 psig. The reflux vent 132 can be at atmospheric pressure. The pressure of these emissions is boosted to contact tower 110 pressure.

A properly applied venturi 195 is capable of handling the volume of vent 132 and flash gas 142 streams from the full gas processing range of glycol dehydration systems, as well as other natural gas processing and treating systems, such as amine. As the vent streams are typically vented or flared, the venturi 195 provides a means to instead gather vapors for economic benefit and to reduce greenhouse gas (GHG) emissions. The versatility of the venturi 195 allows placement within the piping system where the energy in the water rich glycol, the inlet wet gas stream, or the pumped lean glycol stream can be harnessed as the motive energy to draw the vented vapors into the venturi 195, boost the pressure, and feed the vapors into the gathering line.

The reflux gas 132 contains 100% of the water vapor removed by the contact tower. This water may be removed by use of a typical aerial cooler 190 to condense the water and heavy hydrocarbons. The liquids are recovered and handled by a small 2 or 3-phase separator 192. The non-condensable gases can then be routed to the venturi (jet pump/ejector) 195 installed in a line running from the reflux column condenser ultimately back to the contact tower.

With proper controls, the motive fluid flow through the venturi 195 can induce sufficient vacuum on the reflux column 130 to aid in removing additional water from the glycol, possibly eliminating the need for stripping gas. If the vacuum applied to the still column 130 is too great, a wet process slip stream can supplement the low pressure feed the venturi 195 or the flash gas 142 can be combined in the reflux vent 132 line.

Figure 3:
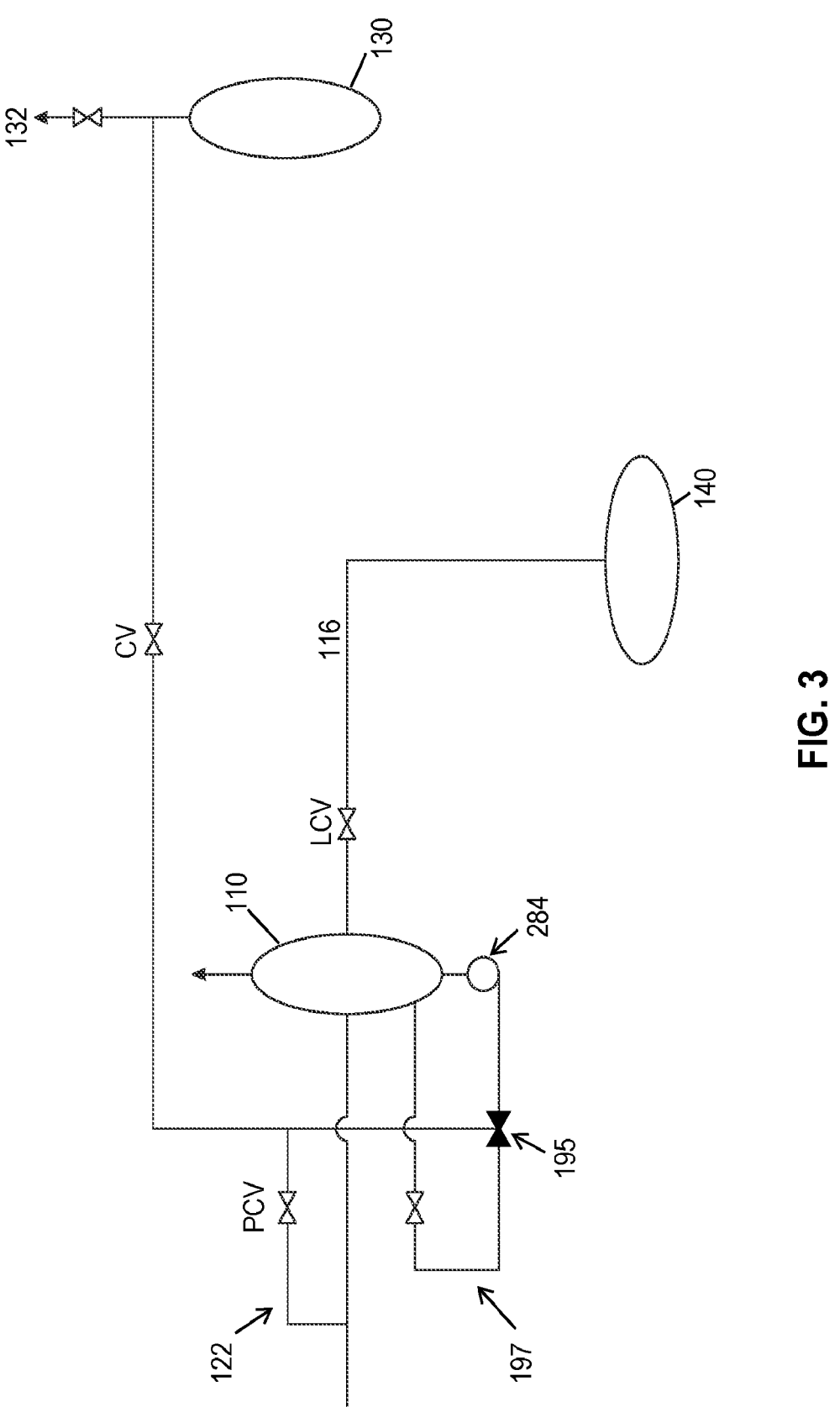
FIGS. 3-4 schematically illustrate example systems and processes for reflux vapor recovery using rich glycol.
Figure 4:
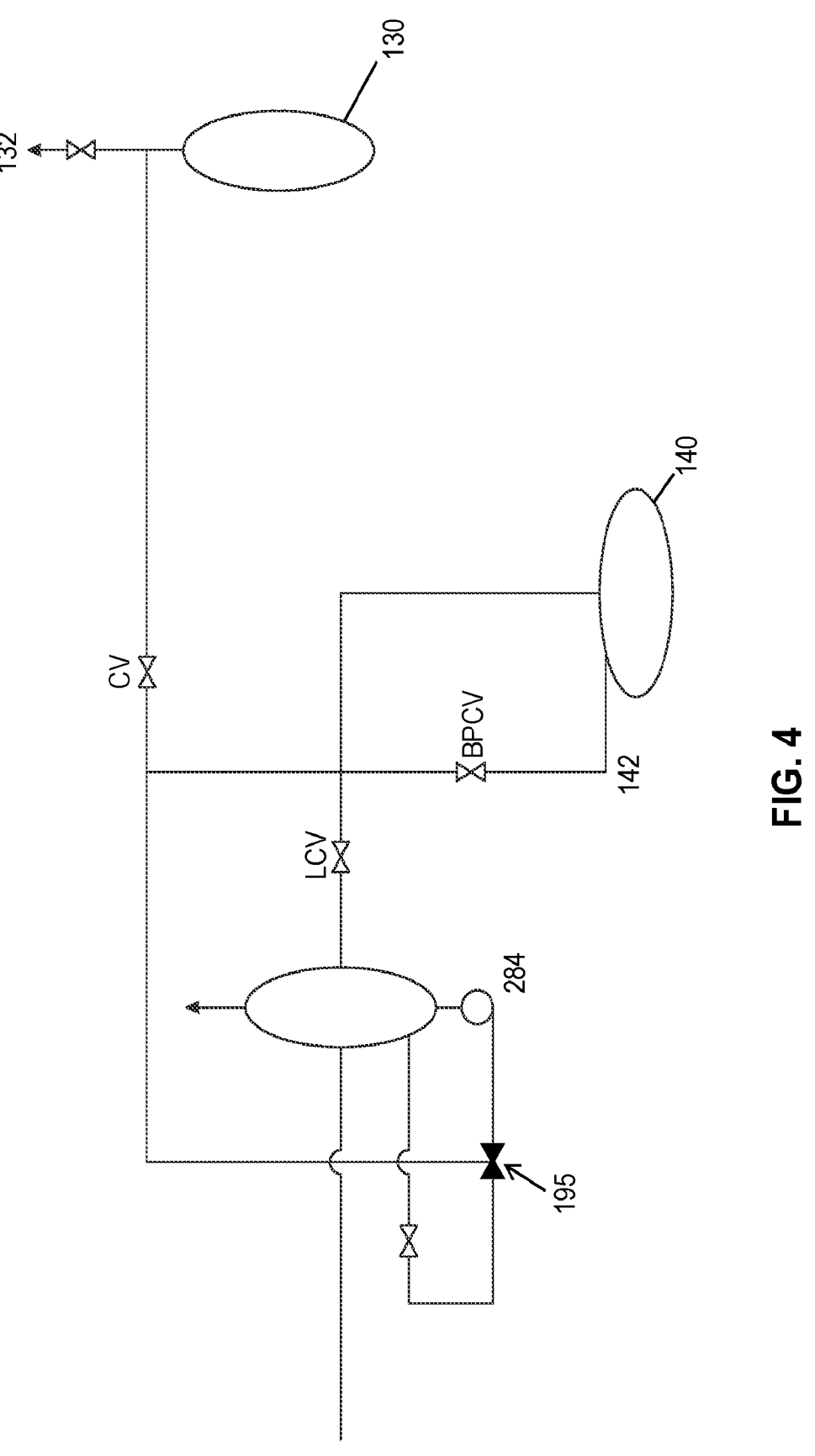

Systems and methods using the venturi 195 to enable recovery of the reflux gas 132 use a recycled stream 197 of wet glycol drawn from the bottom of the contactor 110 and a booster pump 284 to provide motive energy in the venturi 195 to pick up the vapors and return them to the contactor 110. FIGS. 3 and 4 schematically illustrate example systems and processes for reflux vapor 132 recovery using rich glycol. Reflux pressure control can be provided by, for example, process gas slip stream 122 as shown in FIG. 3, and flash gas 142 addition as shown in FIG. 4.

Figure 5:
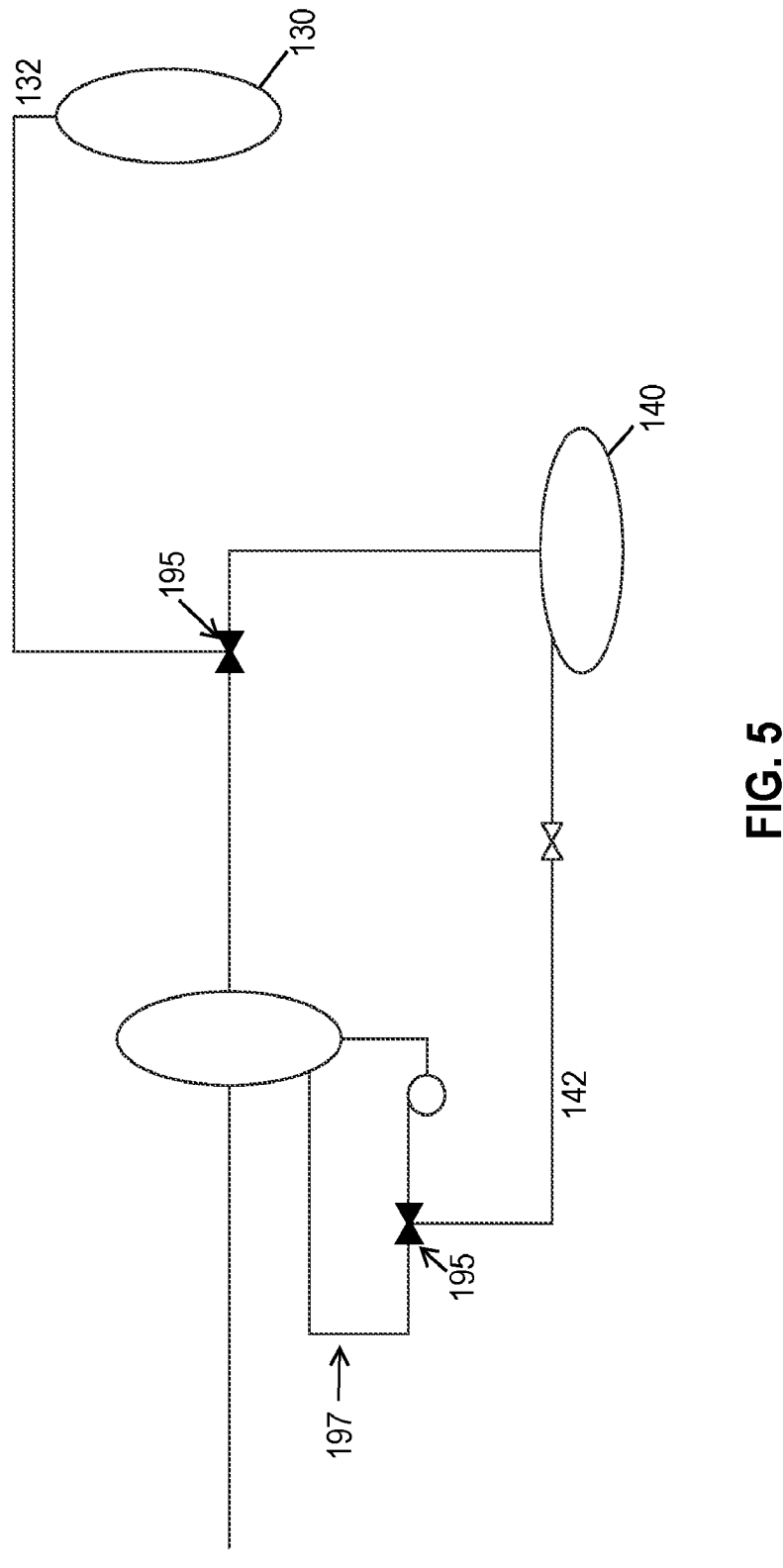
FIGS. 5-9 schematically illustrate example systems and processes for reflux and flash gas vapor recovery.
Figure 6:
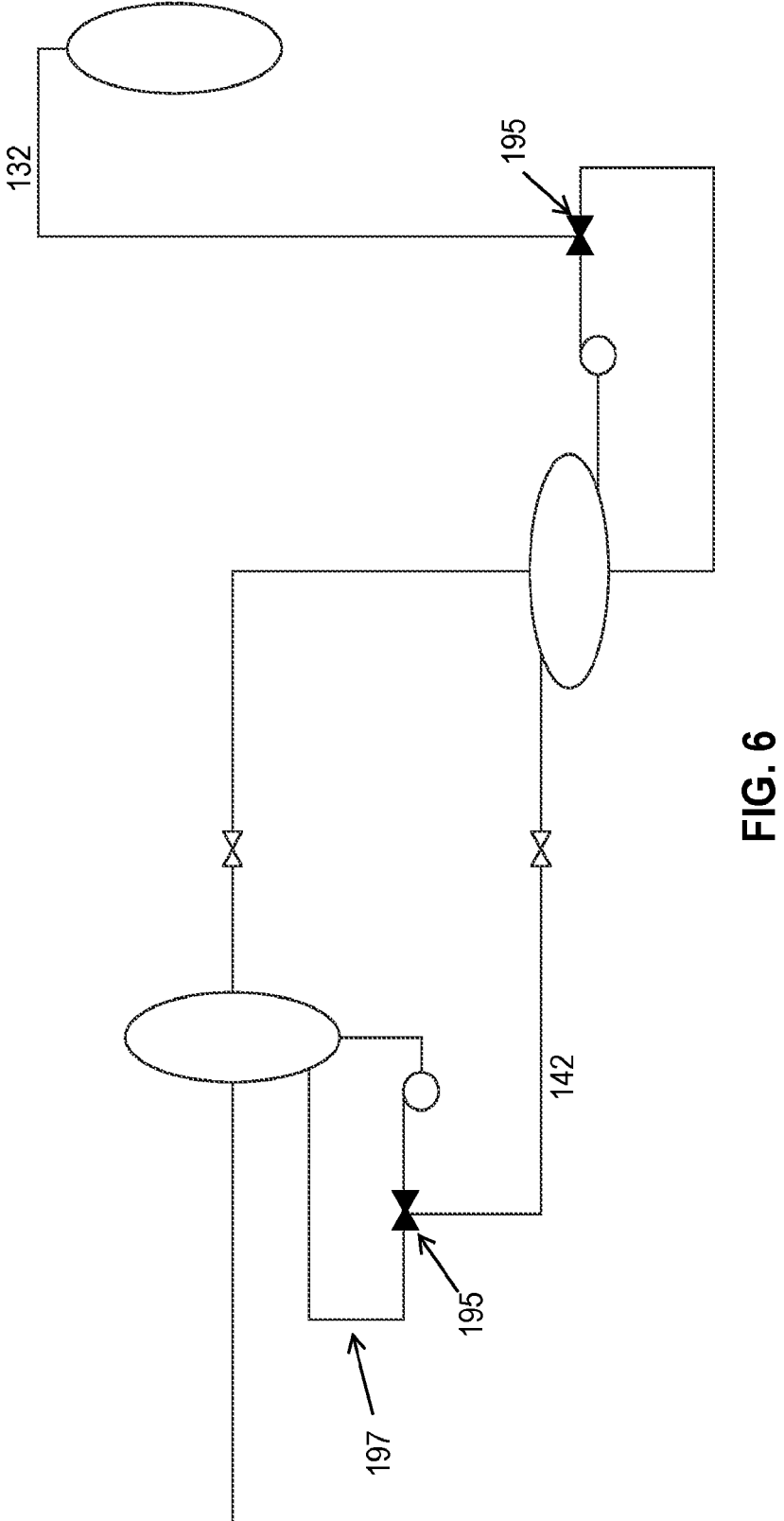

Flash gas 142 from the flash separator/skimmer 140 can be similarly captured using a venturi 195. In such a configuration, the recycled glycol stream 197 pumped from the bottom of the contactor 110 is used as the motive fluid to capture the vapors 142 and route them to the contactor 110. In some configurations, multiple venturis 195 can be applied to combine the recovery of both vapor streams using the high pressure glycol stream and the glycol recycle pump. FIGS. 5 and 6 illustrate example configurations for reflux 132 and flash 142 Gas capture. Rich glycol return is used as the motive fluid to capture reflux gas 132, which is then combined with flash gas 142. The wet glycol recycle pump 197, 284 is used for combined vapor stream capture.

Figure 7:
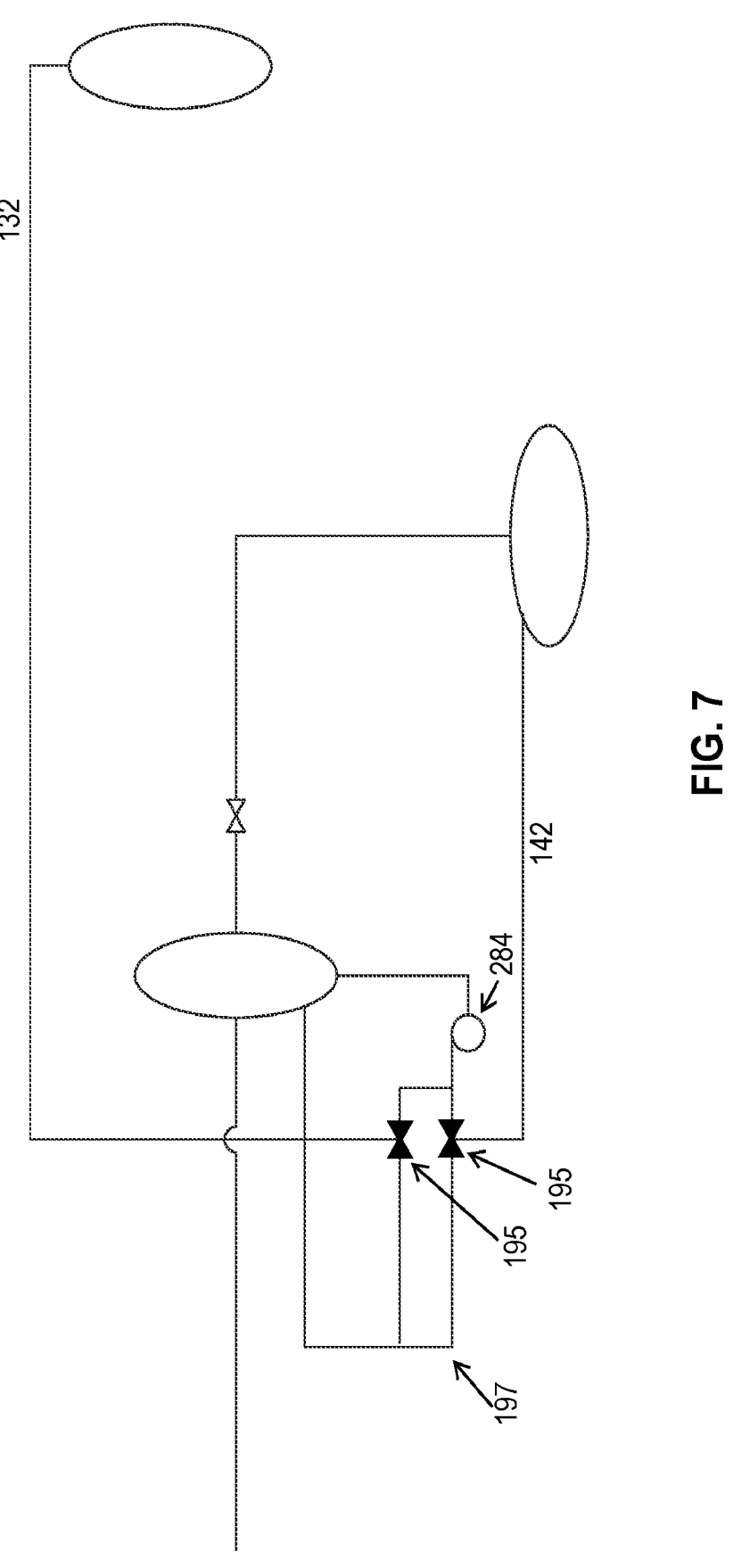
Figure 8:
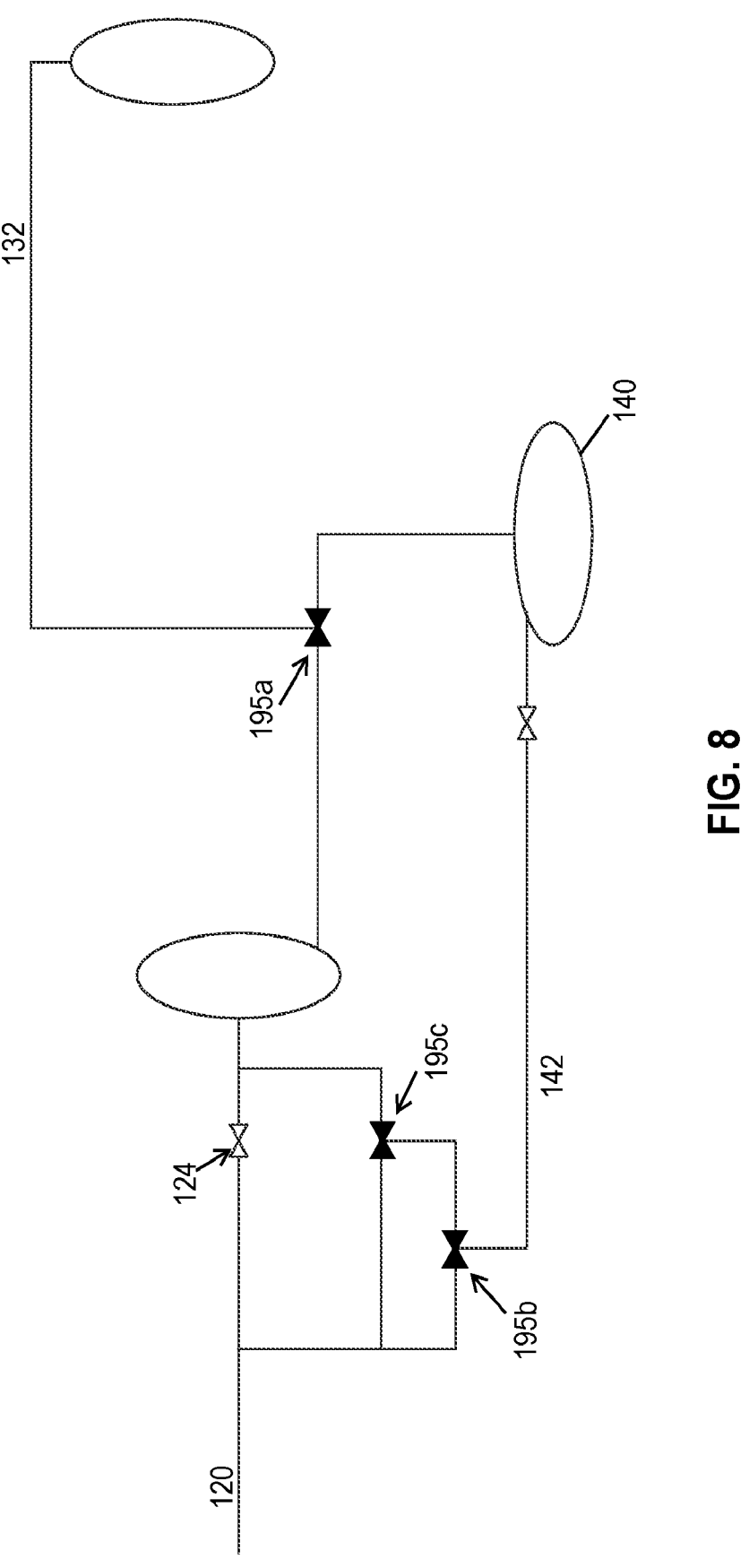

FIG. 7 schematically illustrates another configuration in which the liquid/vapor jet pump 195 uses the pumped glycol recycle 197 to recover both streams (reflux 132 and skimmer 142) without high pressure wet glycol use. The venturis 195 and pump 284 can be sized based on the required vapor load and pressure differential. FIG. 8 schematically illustrates another configuration in which the wet process gas feed 120 to the contactor 110 is used as the motive fluid to energize the venturi 195 and provide suction for the reflux gas 132 capture and reintroduction to the contact tower 110. As shown, three venturis 195 can be cascaded. The first venturi 195a captures the reflux gas 132 and combines with the flash separator 140. The second venturi 195b uses the process gas 120 to capture the vent gases 132, 142. The third venturi 195c compresses the vapors 132, 142 to the pressure of the contactor 110 pressure, which operates at a reduced pressure regulated by an inlet pressure control valve 124 in the main gas line.

Figure 9:
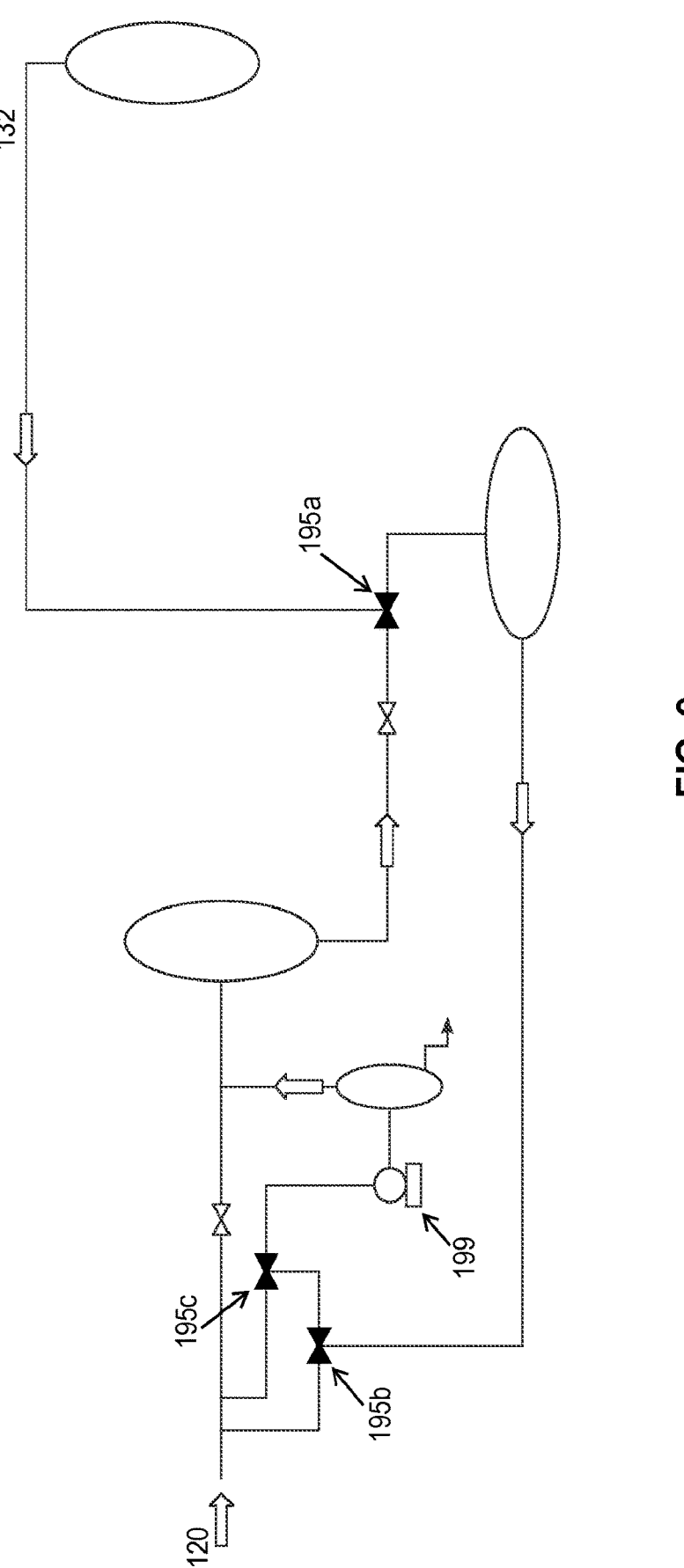

FIG. 9 schematically illustrates another configuration including cascaded venturis 195. The system and process of FIG. 9 uses the process gas 120 as the motive fluid and integrates a compressor into the line at the discharge of the final venturi 195c. After the vent 132 and flash 142 gases have been captured, the venturi outlet gas is routed to a compressor 199 to boost the stream to the upstream delivery line pressure before entering the contactor 110. This ensures the contactor 110 remains at its required operating pressure for down stream delivery of the gas.

Some systems and methods according to the present disclosure include a low pressure (LP) venturi pump (which may include a venturi 195 and a booster pump 284) 195L and a high pressure (HP) venturi pump (which may include a venturi 195 and a booster pump 284) 195H to recycle the vent streams back to the inlet of the contact tower 110. To avoid recycling the extracted water, a cooler 190 (natural or forced convection) is used to condense the water from the reflux vent 132. This water is then recovered by a small separator 192 and collected for disposal. The non-condensable gases from the separator are routed to the low pressure (LP) venturi 195L connected to the skimmer 140 (aka flash separator).

The motive liquid for this LP venturi 195L is drawn from the skimmer 140 and delivered to the venturi 195. The non-condensable reflux gases 132 are inspirated at the venturi throat and combined with the motive liquid for return to the skimmer 140. The non-condensable gases mix with the flash gas 142 in the skimmer 140. The vent gas 142, 132 from the skimmer 140 is routed to a high pressure (HP) venturi 195H connected to the liquid sump 111 of the contact tower 110.

The motive liquid for this HP venturi is drawn from the contact tower sump 111 combined with the skimmer vent gas 142, 132 and delivered to the contact tower 110 inlet. An alternative is to use an auxiliary separator connected to the contact tower sump 111. In some configurations, a recycled glycol stream 197 pumped from the bottom of the contactor 110 is used as the motive fluid.

These dual venturis 195L, 195H function like a two-stage compressor. In stage 1, the LP venturi 195L compresses the reflux gases 132 from near atmospheric pressure to the pressure of the skimmer 140. In stage 2, the HP venturi 195H compresses the vent gas 142, 132 from the skimmer 140 to the pressure of the contact tower 110. The combination of two venturis can advantageously reduce or minimize the energy needed to recover both vents 132, 142.

Figure 10:
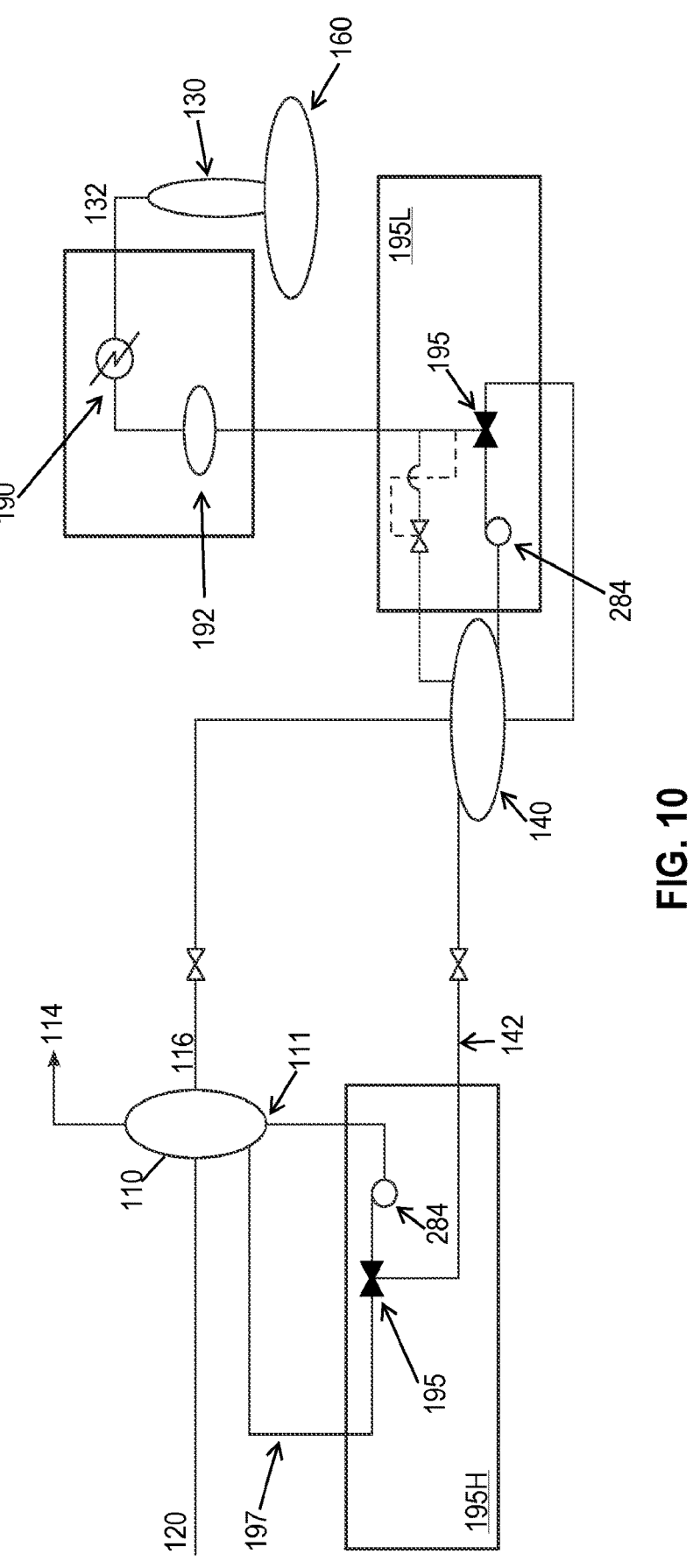
FIG. 10 schematically illustrates an example system and process for vapor recovery including dual venturis.
Figure 11:
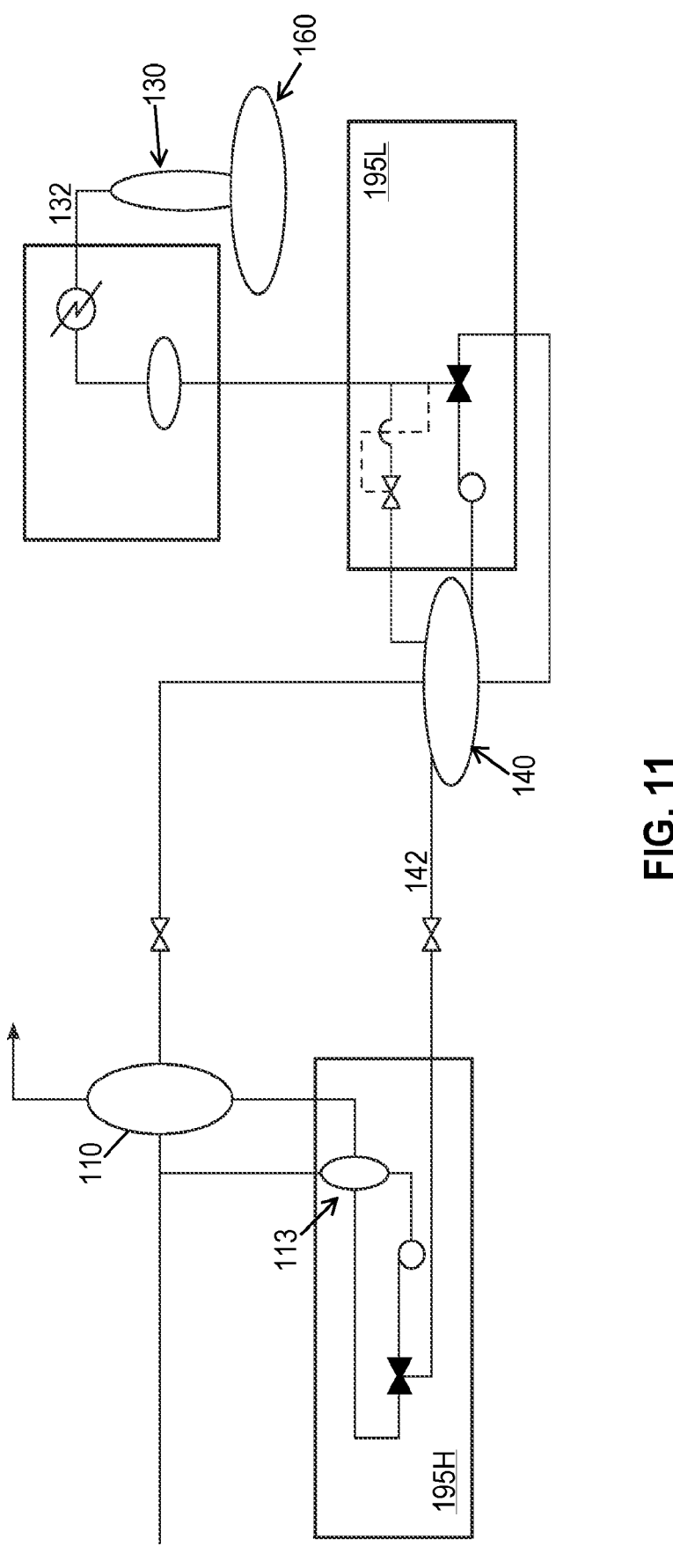
FIG. 11 schematically illustrates an example system and process for vapor recovery including dual venturis.

FIG. 10 schematically illustrates the use of the LP and HP venturis 195L, 195H. As shown, the pump suction of the high pressure venturi 195H is in fluid communication with, e.g., connected directly with, the contact tower 110. When retrofitting this HP venturi 195H to operating dehydrators, the tower 110 may lack connection flanges or have insufficient volume for the pump flow. In those instances a separate vessel 113 can be used to provide 1) sufficient volume to the venturi pump and 2) separation of the compressed vent gas for delivery to the contact tower, for example as shown in FIG. 11.

A properly applied venturi 195 is capable of handling the volume of vent 132 and flash 142 gas streams from the full gas processing range of glycol dehydration systems, as well as other natural gas processing and treating systems such as amine. As the vent streams are typically vented or flared, the venturi 195 provides a means to gather vapors for economic benefit and reduce green house gas emissions (GHG). The versatility of the venturi 195 allows placement within the piping system where the energy in the water rich glycol 116, the inlet wet gas stream 120, or the pumped lean glycol stream 112 can be harnessed as the motive energy to draw the vented vapors into the venturi, boost the pressure, and feed the vapors into a gathering line or back to the process inlet.

Process Gas Slip Stream

With proper controls, the motive fluid flow through the venturi 195 can induce sufficient vacuum on the reflux column 130 to aid in removing additional water from the glycol and possibly eliminate the need for stripping gas. Conversely, if the vacuum applied to the still column 130 is too great, slip stream delivered from the skimmer 140 can supplement the reflux gas 132 to maintain an optimum venturi feed gas pressure. FIGS. 10 and 11 show the PCV used to control the LP venturi 195L gas pressure.

In systems and methods using the venturi 195 to enable recovery of the reflux gas 132, a recycled stream 197 of wet glycol 116 drawn from the bottom of the contactor 110 and a booster pump 284 provide motive energy in the venturi 195 to pick up the vapors and return them to the contactor 110.

The dual venturi systems and methods can be designed or configured to achieve 100% recovery of both vented gas at the lowest energy consumption. The technique as described advantageously reduces the CO2e emissions from a glycol dehydrator by 94%. The remaining 6% is attributable to the fuel used by the reboiler and energy used by the glycol delivery pump.

Cooling Downstream of Eductors

The fluid that exits the eductors in both stages will increase in heat due to both the liquid motive pump (to boost the pressure) as well as the inefficiency of the eductor. A cooler, such as an ambient air cooler, can be placed downstream of these eductors to remove the heat from the overall process. Decrease in process separation efficiency from higher operational temperature caused by these recovered fluids is specifically noted in the case of the stage 2 eductor back to the contactor column.

Skimmer Vapor for Stripping Gas

Some situations will require stripping gas to be used in the regeneration column to make the specified sales gas dew point temperature. Additional volumes will be handled in both stage 1 and 2 eductor setups due to these extra gas volumes requiring recovery if taken from the sales gas. This will require additional utilities and therefore emissions.

Dried vapor that has been recovered into the skimmer unit can be used as stripping gas into the regenerator column. Although this will not reduce the vapor volumes within the stage 1 recovery eductor, it will allow the stage 2 recovery eductor to not realize any additional volumes due to this recycled stripping gas configuration.

Vent Gas Recovery Options

Although the configurations shown in and described with respect to FIGS. 10-11 may result in the lowest GHG emissions and therefore be preferred in some cases, there are numerous ways to deploy venturis 195 for the collection and recycle of the vented gases 132, 142. The BTEX Buster for water removal is not shown, but may be included or required in all options. While the process described is a gas dehydration method using glycol as the absorbent, there are other processes where venturis 195 could be used.

In some systems and methods according to the present disclosure, the energy of the overall dehydration process is harvested for emission reduction purposes. Three possible applications of the harvested energy are: rich glycol hydraulic turbine, integrated organic rankine cycle (ORC), and regenerator reboiler heat pump.

Rich Glycol Hydraulic Turbine

Figure 12:
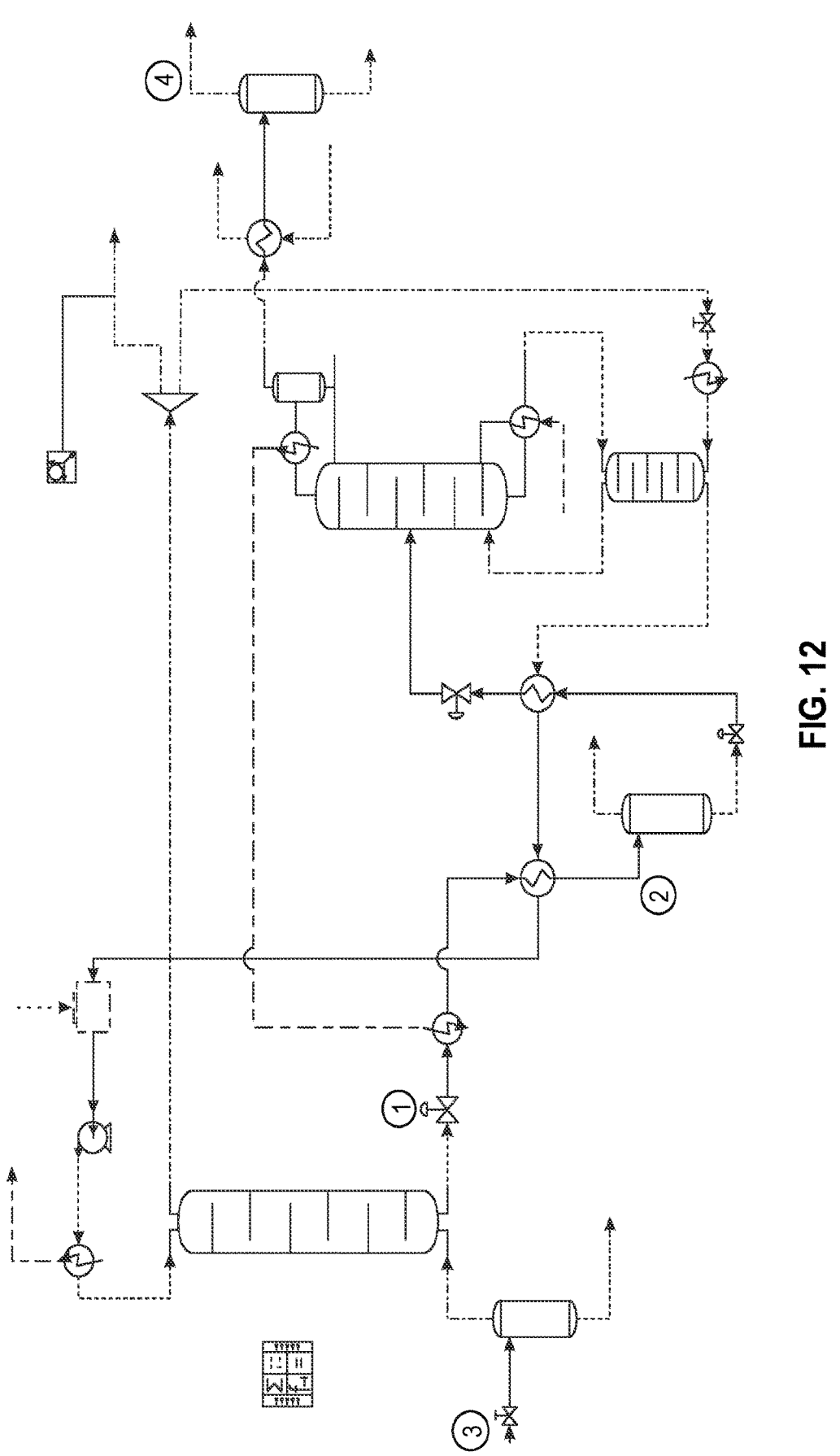
FIG. 12 schematically illustrates an example dehydration system including a rich glycol hydraulic turbine arrangement.

Prior energy exchange pumps in TEG dehydration plants have used pressure letdown of the rich glycol stream 116 downstream of the contacting column 110 as an energy harvesting source, as indicated by item 1 in FIG. 12. Most of these units apply the energy gained to pumping of the lean glycol 112 back to the contactor 110 from the regenerator. This arrangement is sometimes referred to as a hydraulic turbocharger.

Instead, this energy could be applied to the vented emissions from a medium to low pressure flash tank 140, indicated by item 2 in FIG. 12. The vented emissions 142 from the flash tank 140 contain potentially off sales specification water content. These vented emissions 142 should therefore not be mixed into the sales gas 114, but instead mixed into the feed gas 120 if the necessary pressure can be recovered, indicated by item 3 in FIG. 12.

Vented or flared gases 132 from the regenerator column's top product, indicated by item 4 in FIG. 12, could also take advantage of a hydraulic turbocharger application. Normally, this is not ideal, as these units work on volumetric flow equivalent and the low pressure of these additional emission vapors cause higher volumes for less GHG mass abated. However, there is an advantage to condensing out water content as much as possible with cooling prior to recovery due to the reduced volumes.

Integrated Organic Rankine Cycle (ORC)

An organic Rankine cycle can be integrated with any facility that produces waste heat not otherwise being utilized. In these applications, a recirculated fluid exchanges heat with the facility and causes partial vaporization of the fluid. The vapors are then separated from the liquids and optionally super-heated before being fed through a power generation turbine.

Figure 13:
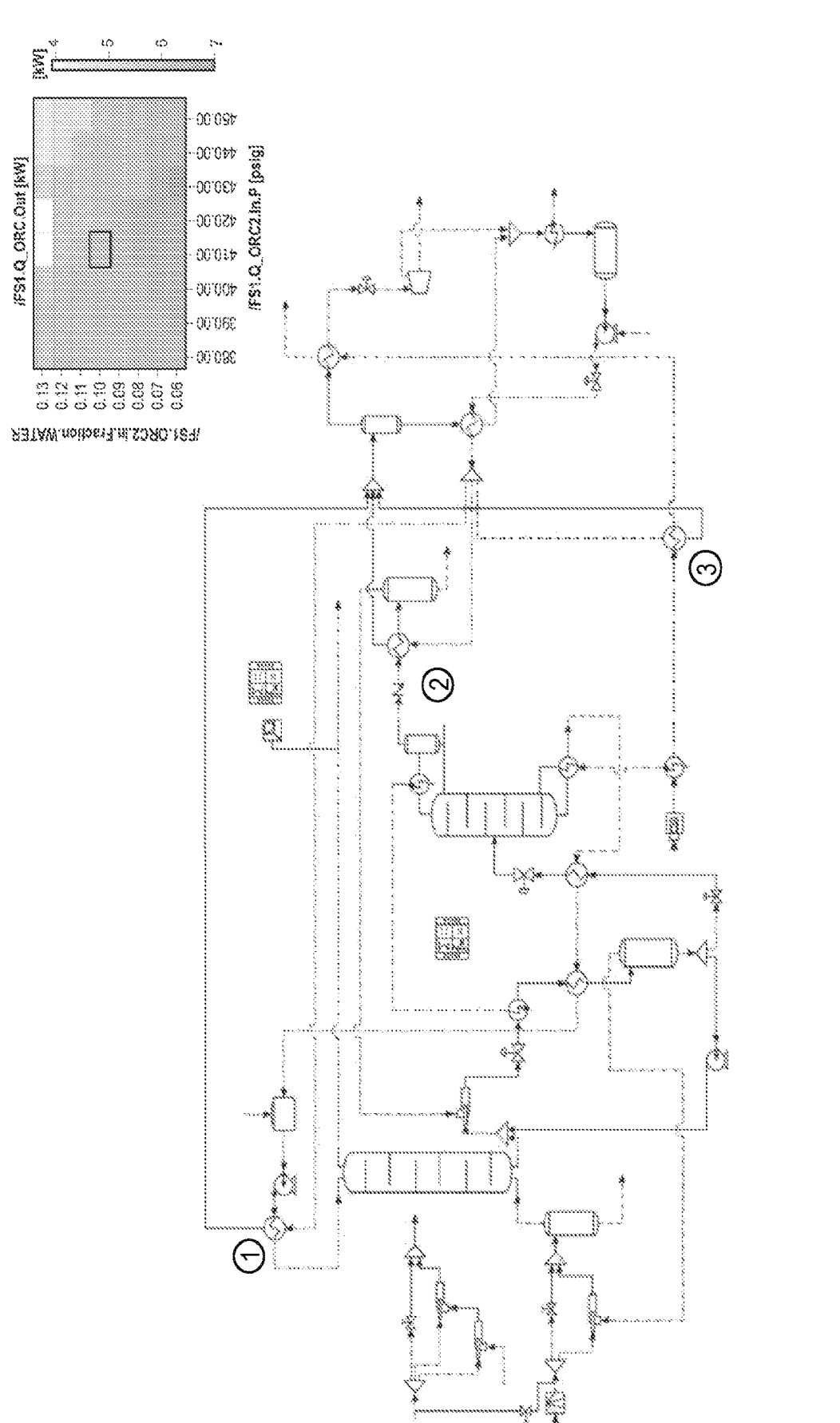
FIG. 13 schematically illustrates an example dehydration system including an integrated organic Rankine cycle arrangement.

TEG dehydration facilities include multiple points of required heat removal that are not commonly exchanged or integrated. Any one or combination of these sources could be utilized. Heat sources and general temperatures at cooling locations include, with reference to FIG. 13: 1) cooling of the recirculated lean TEG fluid 112, 223 F (106 C); 2) cooling and condensing of regenerator top vapors 132, 239 F (115 C); and 3) cooling regenerators reboiler 160 exhaust gases, 550 F (288 C). To utilize low waste heat temperatures, there are a limited number of fluids having the correct boiling point temperature of vaporization at pressures high enough to run through a turbine. An example of such a fluid, having a high heat capacity for optimal efficiency, is a mixture of water and ammonia, also known when applied as a "Kalina" ORC process.

If optimized, there is an estimated 6 kW or more of power generation that could be extracted from a Kalina ORC process per 100 MMSCFD of feed gas. This would be assuming the pressure and exact Water:Ammonia mixture of the fluid has been optimized as shown in the plotted grid of FIG. 13. The ORC's super-heater would be best exchanged with the hottest of the waste heat sources, also shown in FIG. 13 with the final exhaust gas, which applies to most configurations with reboiler burners.

Regenerator Reboiler Heat Pump

Figure 14:
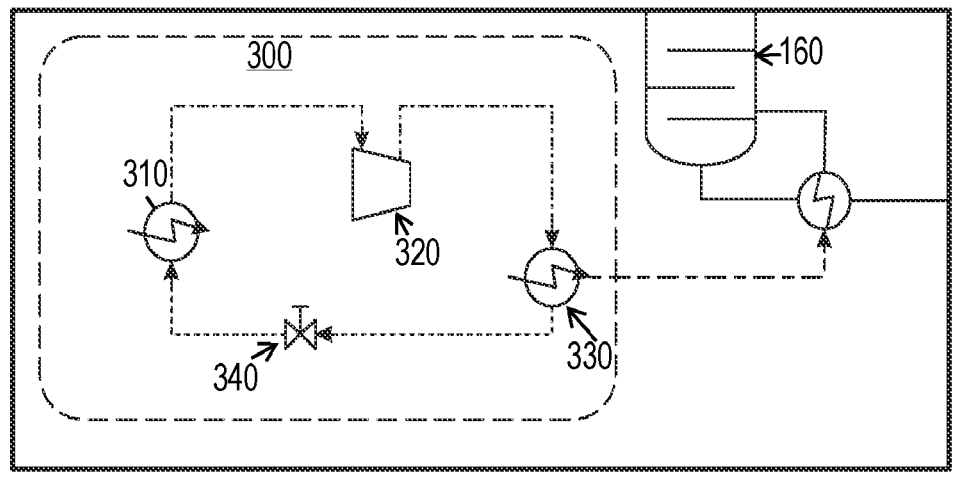
FIG. 14 schematically illustrates an example heat pump for use with a dehydration system.

Heat pumps 300 are utilized to take advantage of waste heat within a process. FIG. 14 illustrates the heat exchange loops. As shown, such systems and methods include a boiling heater 310, compressor 320, condensing cooler 330, and expansion valve 340. The heat exchange medium fluid is selected for the boiling and dew point temperatures at different pressures. Usually, the temperatures of the source and desired delivery points dictate the final single, or multi-component, fluid of choice.

For TEG dehydration facilities, emissions will typically result from the energy supplied to regenerate the rich glycol. These emissions would be considered Scope 1 if the reboiler 160 on the regeneration column is being heated by a burner system with hydrocarbon fuel. Scope 2 emissions would be considered if the reboiler 160 was electrified and the electricity source came from power generation using NG, coal, or similar. In order to reduce these associated emissions from this energy requirement, a heat pump 300 as described herein can be applied to supply part of the energy to the reboiler 160, as shown in FIG. 14.

Only part of the energy requirement for the reboiler 160 may be delivered by the heat pump 300 due to the higher temperatures required, e.g., around 399 F (204 C). The heat pump 300 can be connected in multiple locations, including, for example: the reflux condenser 130 at the top of the reboiler 160, feed gas stream 120 before or after inlet knock out separator, sales gas stream 114 before or after any recompression, or other heat sources from close proximity facilities with consistent operation. In some configurations, increased chilling of feed gas 120 from a heat pump 300 prior to a knockout separator can create further advantages of reducing emissions. This outcome is through the increased dropout of water with the lower achieved temperature that can reduce circulation rates of the glycol fluid required to achieve a final dew point specification on the sales gas. The reduced circulation decreased associated emissions from both the reboiler duty and pumping duty.

Figure 15:
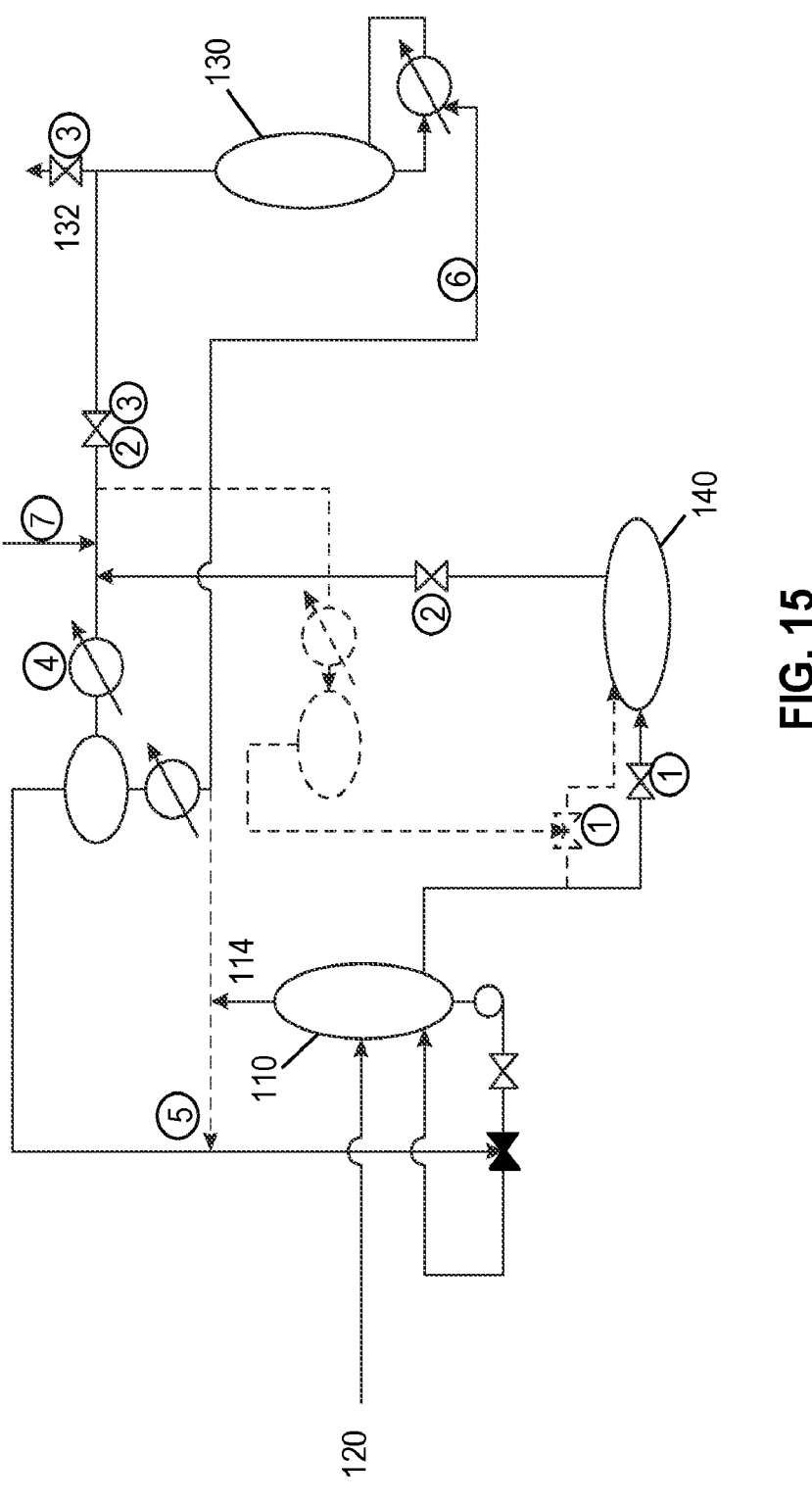
FIG. 15 schematically illustrates an example glycol dehydration system and process in which reflux gas and skimmer gas are recovered.

In various systems and methods according to the present disclosure, process configurations and controls can advantageously maximize efficiency and reliability, while reducing or eliminating GHG emissions. FIG. 15 schematically illustrates various example process configuration and process control schemes to allow for collection of skimmer 142 and/or reflux gases 132. Any one or more of these process configuration and control schemes can be used in combination with any of the various dehydrator configurations shown and described herein.

With reference to FIG. 15, item 1 indicates contactor level control (LC) with reflux jet pump (JP). Traditional TEG contactor rich TEG 116 level control employs a level control valve (LCV) fit at the inlet to the skimmer 140. In some configurations including a Reflux Jet Pump (JP) (a venturi 195, and possible boost pump 284) configured to capture reflux gas 132), the recycled rich glycol stream 197 from the bottom of the contactor 110 is used as the motive fluid to capture the reflux vapor 132, and the JP 195 (or 195H) itself serves as the level control for the TEG contactor 110 rich TEG 116. The Contactor Level Control with JP (in conjunction with a side LCV if necessary) maintains a desired liquid level within the contactor 110 while achieving desired motive fluid input to the JP 195H by accommodating the JP suction gas flowrate/pressure variations.

Item 2 indicates pressure/vacuum control to JP. A concern when recovering low pressure gas from the flash separator vent 142 and reflux vent 132 is the creation of an undesired vacuum in the suction side if the flare gas pressure or flow drops significantly and the high-pressure motive fluid keeps flowing through the ejector. The Pressure/Vacuum Control to the JP maintains the desired pressure at the suction side. In various configurations, depending on the type of JP, the control strategy can be a recycle control valve recycling gas from the discharge of the ejector to the suction, and/or controlling the pressure or flowrate of the HP motive liquid (liquid motive control configuration shown in FIG. 15).

Item 3 indicates pressure control (vacuum) at reflux. The JP recycling is capable of reducing the operating pressure of the reflux column 130 to a slight vacuum. This advantageously aids in removing additional water from the glycol and potentially eliminates the need for stripping gas. The pressure control strategy for the Pressure Control (Vacuum) at Reflux maintains the pressure (vacuum) of the reflux within the desired range while accommodating the suction pressure need/variation of JP.

Item 4 indicates pre-cooler for flash separator/reflux vent-contactor recycle. The reflux gas 132 contains 100% of the water vapor removed by the contact tower; the flash separator vent 142 contains water vapor (low volume) and light hydrocarbon (HC). The heavy components must be removed from the reflux 132 and flash gas 142 through a 3-phase separator 192 before they are recycled to the contactor 110. This removal step is handled by a typical aerial cooler 190 to condense the water and heavy hydrocarbons. The liquids are recovered and handled by a small 3-phase condenser 192 where HC (hydrocarbon) condensation can be vaporized to be used as feed gas or stripping gas (see Items 5 and 6). The non-condensable gases can then be routed to the JP 195 for recycling to the Contactor 110. Systems and methods according to the present disclosure advantageously couple the benefits of the Drizo process and recovery of the non-condensable gases.

Item 5 indicates vaporize and recycle condenser HC to feed gas. The heavy components in the flash separator vent 142 and reflux vent 132 can be recycled as the condenser HC liquid phase and vaporized to be used as the feed gas to the contactor. The process configuration can maximally eliminate, minimize, or reduce the overall emission and waste from the system.

Item 6 indicates vaporize and recycle condenser HC as stripping gas (Drizo). As an alternative recovery, the heavy components in the FS vent and reflux can be recycled as the condenser HC liquid phase and heated to vaporize to be used as stripping gas to the reboiler. This is particularly applicable to the Drizo process where the recycling of FS vent and reflux vent heavier component is expected to provide the best dehydration process performance while eliminating/minimize the emission and waste.

Item 7 indicates combination with other vents. The JP system (shown in FIG. 15) is not only able to collect the flash vent 142 and reflux vent 132 within the TEG unit, but also able to take multiple vent sources. For example, other low pressure vent sources can be adjacent process units/facilities where routing the vent to the JP is feasible.

Another possibility is reboiler 160 temperature control. The Range control is often applied to reboilers in order to keep the general performance of a fractionation and/or separation index within a separation column. Although easy to implement, range control can cause oscillations in the vapor traffic due to the varied boiling temperature achieved. A PID (Proportional-Integral-Derivative) controller applied to the energy delivery for the reboiler of the TEG regenerator allows a more consistent temperature set point. This consistent temperature, and therefore energy input to feed ratio, maintains a more consistent vapor flow rate as input to the vapor recovery system. This in turn will allow operation of the recovery system closer to the design conditions and require less bleed gas from other sources (e.g. main contactor feed gas) to be utilized for a constant liquid jet flow. In other configurations, MPC (Multivariable predictive control) systems could be used in place of the PID single control loop for similar benefits as described above.

The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Techniques similar to those presented here could also be applied to amine-based gas sweetening systems.

In the claims, means-plus-function clauses are intended to cover the structures described herein as performing the recited function and not only structural equivalents, but also equivalent structures. Thus, for example, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A system, comprising:
a contact tower having an inlet;
a reflux column configured to receive a rich glycol stream from the contact tower, wherein the reflux column is configured to generate a reflux gas stream;
a flash separator configured to receive at least a portion of the reflux gas stream, wherein the flash separator is configured to generate a flash gas stream, and at least a portion of the flash gas stream is diverted back to the inlet of the contact tower;
a first venturi pump configured to compress the reflux gas stream from near atmospheric pressure to a pressure at or near a pressure of the flash separator; and a second venturi pump configured to compress the reflux gas stream and the flash gas stream to a pressure at or near a pressure of the contact tower, wherein the first venturi pump comprising a first venturi and the second venturi pump comprising a second venturi, wherein in use, at least one of the reflux gas stream or the flash gas stream is drawn through one or more venturis comprising the first venturi and/or the second venturi to the contact tower.

2. The system of claim 1, wherein the reflux gas stream comprises benzene, toluene, ethylbenzene, or xylene.

3. The system of claim 1, comprising a heat exchanger configured to receive the reflux gas stream from the reflux column, wherein the heat exchanger is configured to cool the reflux gas stream to generate a non-condensable gas stream.

4. The system of claim 3, comprising a separator configured to receive the non-condensable gas stream from the heat exchanger, wherein the separator is configured to separate liquid water from the non-condensable gas stream.

5. A glycol based dehydration system, comprising
a contact tower, wherein in use, wet gas enters the contact tower and is dehydrated by glycol flowing through the contact tower, and a water-rich glycol stream exits the contact tower;
a reflux column configured to filter and heat the water-rich glycol stream, wherein the reflux column is configured to generate a reflux gas stream from the water-rich glycol stream;
a flash separator configured to receive at least a portion of the reflux gas stream from the reflux column, wherein the flash separator is configured to generate a flash gas stream;
a high pressure venturi pump comprising a first venturi of one or more venturis; and
a low pressure venturi pump comprising a second venturi of the one or more venturis wherein in use, at least one of the reflux gas stream or the flash gas stream is drawn through the one or more venturis to the contact tower, wherein the low pressure venturi pump is configured to compress the reflux gas stream from near atmospheric pressure to a pressure at or near a pressure of the flash separator, and the high pressure venturi pump is configured to compress the reflux gas stream and the flash gas stream to a pressure at or near a pressure of the contact tower.

6. The system of claim 5, wherein the one or more venturis comprises a cascaded arrangement of three venturis.

7. The system of claim 5, wherein in use, at least one of the reflux gas stream or the flash gas stream is routed to the one or more venturis as a pressure control to avoid excessively low pressure on the reflux column.

8. The system of claim 5, wherein the high pressure venturi pump and the low pressure venturi pump each comprise a booster pump.

9. The system of claim 5, wherein a recycled glycol stream pumped from a bottom of the contact tower is configured to be used as motive fluid for the high pressure venturi pump.

10. The system of claim 5, comprising a heat exchanger configured to receive the reflux gas stream from the reflux column, wherein the heat exchanger is configured to cool the reflux gas stream to generate a non-condensable gas stream.

11. The system of claim 10, comprising a separator configured to receive the non-condensable gas stream from the heat exchanger, wherein the separator is configured to separate liquid water from the non-condensable gas stream.

12. A method for glycol based dehydration, comprising:
dehydrating a wet gas in a contact tower via a glycol flowing through the contact tower, and outputting a water-rich glycol stream from the contact tower;
filtering and heating the water-rich glycol stream via a reflux column, and generating a reflux gas stream from the water-rich glycol stream via the reflux column;
receiving at least a portion of the reflux gas stream from the reflux column via a flash separator, and generating a flash gas stream via the flash separator;
drawing in at least one of the reflux gas stream or the flash gas stream through one or more venturis to the contact tower, wherein the one or more venturis comprise a first venturi of a first venturi pump and a second venturi of a second venturi pump;
compressing, via the second venturi pump, the reflux gas stream from near atmospheric pressure to a pressure at or near a pressure of the flash separator; and
compressing, via the first venturi pump, the reflux gas stream and the flash gas stream to a pressure at or near a pressure of the contact tower.

13. The method of claim 12, comprising receiving the reflux gas stream from the reflux column into a heat exchanger, and cooling the reflux gas stream in the heat exchanger to generate a non-condensable gas stream.

14. The method of claim 13, comprising receiving the non-condensable gas stream from the heat exchanger into a separator, and separating liquid water from the non-condensable gas stream via the separator.

15. A glycol based dehydration system, comprising:
a contact tower, wherein in use, wet gas enters the contact tower and is dehydrated by glycol flowing through the contact tower, and a water-rich glycol stream exits the contact tower;
a reflux column configured to filter and heat the water-rich glycol stream, wherein the reflux column is configured to generate a reflux gas stream from the water-rich glycol stream;
a flash separator configured to receive at least a portion of the reflux gas stream from the reflux column, wherein the flash separator is configured to generate a flash gas stream;
a first venturi pump comprising a first venturi of one or more venturis and a second venturi pump comprising a second venturi of the one or more venturis, wherein in use, at least one of the reflux gas stream or the flash gas stream is drawn through the one or more venturis to the contact tower, wherein the second venturi pump is configured to compress the reflux gas stream from near atmospheric pressure to a pressure at or near a pressure of the flash separator, and the first venturi pump is configured to compress the reflux gas stream and the flash gas stream to a pressure at or near a pressure of the contact tower; and
system controls configured to improve gas recovery, achieve steady state operation, and/or avoid undesirable operating modes.

16. The system of claim 15, wherein the system controls comprises a processor.

17. The system of claim 15, comprising:
a heat exchanger configured to receive the reflux gas stream from the reflux column, wherein the heat exchanger is configured to cool the reflux gas stream to generate a non-condensable gas stream; and a separator configured to receive the non-condensable gas stream from the heat exchanger, wherein the separator is configured to separate liquid water from the non-condensable gas stream.

* * * * *